June 10, 1941.  J. MIHALYI  2,245,214
CAMERA FILM WIND
Filed Oct. 21, 1939
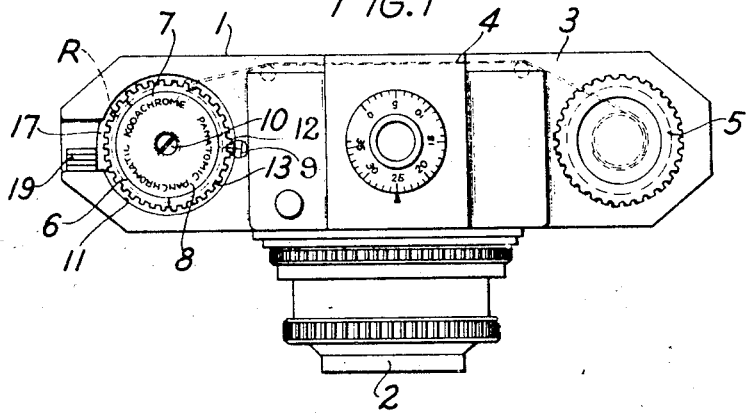
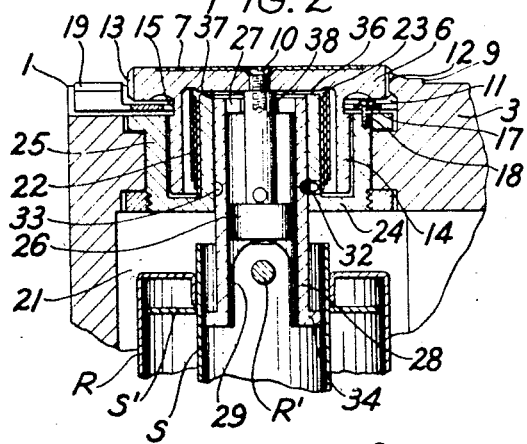
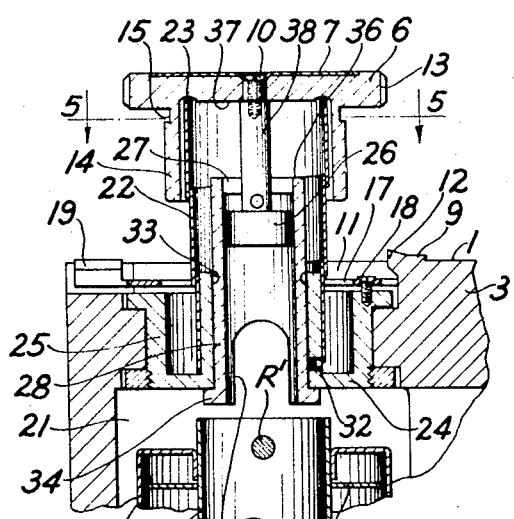
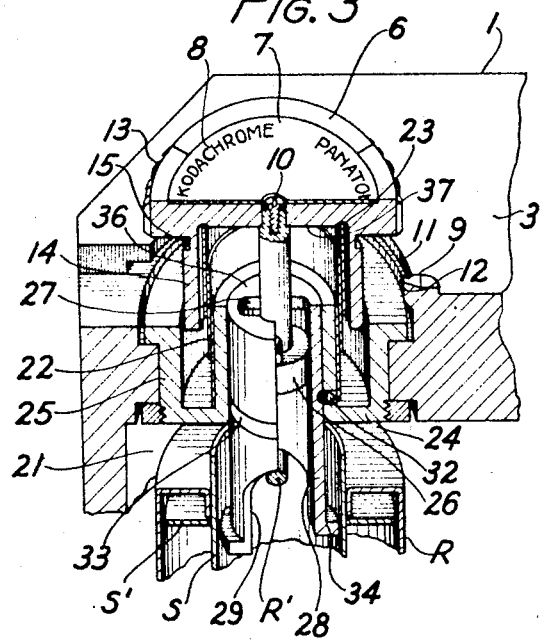
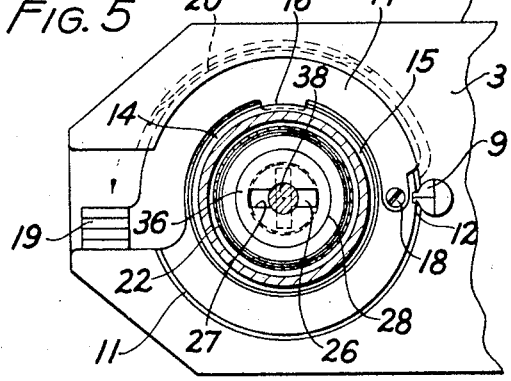
JOSEPH MIHALYI
INVENTOR
BY
ATTORNEYS Patented June 10, 1941

2,245,214

UNITED STATES PATENT OFFICE 2,245,214

CAMERA FILM WIND

Joseph Mihalyi, Rochester, N. Y., assignor to Eastman Kodak Company, Rochester, N. Y., a corporation of New Jersey Application October 21, 1939, Serial No. 300,641

15 Claims. (Cl. 242—71)

This invention relates to photography and more particularly to photographic cameras of the type in which film may be wound from a retort upon a take-up spool by one winding device and returned to the supply retort or spool by a second winding device.

One object of my invention is to provide a rewinding handle for cameras which can be used as an indicator so that the operator can tell what variety of film has been loaded in the camera. Another object of my invention is to provide a rewinding handle which can be used for returning the film into the original retort or onto the original spool and which may be also used to completely withdraw the spool-engaging member from the film chamber to permit the spool or retort to be readily loaded into the camera. A still further object of my invention is to provide a rewinding handle movable into three positions for accomplishing the above-mentioned functions and to provide a means for normally locking the handle against movement in a relatively inaccessible position. Other objects will appear from the following specification, the novel features being particularly pointed out in the claims at the end thereof.

Coming now to the drawing, wherein like reference characters denote like parts throughout;

Fig. 1 shows a top plan view of a camera with a rewinding knob constructed in accordance with and embodying a preferred form of my invention;

Fig. 2 is a fragmentary sectional view showing the rewinding mechanism in a normally inoperative position in which the type of film with which the camera is loaded is indicated;

Fig. 3 is a fragmentary perspective view partially in section, showing the rewinding mechanism as it approaches a film rewinding position;

Fig. 4 is a fragmentary sectional view of the rewinding mechanism in its third or totally withdrawn position which it assumes when the knob has been drawn out for loading fresh film into the camera;

Fig. 5 is a top plan view partially in section and taken substantially on line 5—5 of Fig. 4, showing a portion of the latch mechanism which may hold the knob in its lowermost inoperative position.

In a large number of cameras known generally as "Miniature" cameras, film is loaded into a retort or may be wound upon film spools to which the end of the film is attached so that in the normal operation of exposing film it is drawn across an exposure of a camera and wound upon a take-up spool. After all of the exposures have been made, it is customary with this type of camera to rewind the film onto its original spool or into the supply retort before removing the exposed film from the camera. In the following specification, the term "supply spool" and "retort" may be considered as interchangeable since both of these systems are now commonly in use and both will work satisfactorily with a camera constructed in accordance with my invention.

Referring to Fig. 1, the camera may consist of a camera body 1 having the usual lens tube 2 and having a top plate 3. This top plate may support a finder and a range finder casing 4 and may carry at one end a knurled knob 5 which is for winding the film between exposures from a supply to the take-up.

The supply of film may be furnished in a retort R as indicated in Fig. 2, such retorts usually including a film spool S with or without flanges S' and usually including a rod or web R' extending across the end of the tubular film-supporting spool S.

The top wall 3 of the camera also supports a film rewinding knob 6 which forms the subject of the present invention. This knob is preferably provided with a scale plate 7 having a series of indications 8 of the types of film which may be used in the camera. At the present setting it will be noticed that the dial is set for Panatomic film since the pointer 9 lies opposite this portion of the indicating scale.

The dial plate 7 can be readily arranged to carry a scale indicating all known types or speeds of film and one advantage of my present invention is that by merely removing screw 10, separate scale plates may be readily added, if desirable, so that the scale plates may always be kept up to date.

In the film indicating position shown in Figs. 1 and 2, the knurled knob 6 lies at least partially in the seat or recess 11 in the top wall 3 of the camera. Consequently, the knurling is not sufficiently exposed to turn the knob readily and in addition the knob is latched against turning movement because the pointer 9 includes an inwardly extending lug 12, which definitely engages in an arcuate knurling 13 to prevent rotation of the knob 6.

The knob 6 includes a downwardly extending flange 14 which is annular in shape and which includes an annular groove 15 adapted to be engaged by the inwardly extending lug 16 indicated in Fig. 5 of the arcuate locking bar 17, pivotally attached to the camera at 18 and including a handle 19 by which the latch may be used. A spring 20 resting against the edge of the annular seat 11 normally tends to turn the latch in the direction shown by the arrow to hold it in a latching position. The edge of the latch element 16 is preferably bevelled so that the latch will snap into place when the knob 6 is pressed downwardly, after loading a film into the camera spool chamber 21, which carries the supply of film.

Assuming that a film has been exposed while the rewinding mechanism is in the position shown in Fig. 2, and all of the film has been used, the next operation will consist in rewinding the film. This is done by moving the latch handle 19 in a direction opposite to that shown by the arrow in Fig. 5, permitting the knob 6 to move upwardly into the position shown in Fig. 3. This upward movement occurs because of the coiled spring 22 resting in seat 23 in the underside of the knob 6 and resting on the flange 24 of the annular ferrule 25 carried by the top wall 3 of the camera. The normal tendency of this spring is to raise the knob 6. As the knob 6 springs outwardly under the influence of spring 22, if it should happen that the winding web 26 is not in alignment with the slot 27 in the end of the tubular member 28 as is the case in Fig. 3, it is necessary to turn the winding knob until the web 26 engages the slot 27. This can easily and quickly be done, since, as the knob is turned and as the pressure of spring 22 tends to move the web into the slot, it will immediately do so when the parts are brought into registry. This usually occurs in less than half a turn and as soon as it does occur, the knob 6 is definitely connected with the tubular member 28. This tubular member has a pair of spaced slots 29 best shown in Figs. 2 and 3. These slots embrace the winding pin R' of the retort spool S and consequently when the handle 6 is turned, the spool S will be turned and film may be wound into the retort R. This winding movement is continued until all of the film is in the retort, at which time it may be desirable to remove it. The retort R cannot be moved as long as the sleeve member 28 embraces the pin R'. Consequently, the handle or knob 6 is then pulled outwardly into the position shown in Fig. 4. This outward movement causes the tubular member 28 to move from its operative position in which the spring 32 engages the groove 33 in the periphery of the tubular member so that it is necessary to snap the spring out of the groove during the first part of this outward movement. However, a firm pull on the knob 6 will disengage the snap latch formed by the spring 32 and groove 33 and the tubular member may then be drawn outwardly until its outwardly extending flange 34 engages the under side of the flange 24 of the annular member 25. With the parts in the position shown in Fig. 4, the spool and retort are freed from the winding key which consists of the tubular member 28 and the grooves or slots 29 so that the retort may be removed and a fresh retort loaded into the supply film chamber 21.

Assuming that a different type of film is to be used, the next step after loading the retort will be to turn the knob 6 until the proper indication on the scale plate 8 lies opposite the pointer 9. When so positioned, the knob is thrust directly downwardly without turning. This movement collapses the spring 22 and as soon as the upper end 36 of the tubular member 28 strikes the inside 37 of the winding knob, it will be moved downwardly until the spring 32 snaps into the groove 33, holding the tubular member in place.

While it should be noticed that in this position the winding key cut-outs 29 embrace the pin R', nevertheless the spool S may turn freely, because the tubular member 28 is not in this position keyed to the winding knob. Thus, while the winding knob is latched against turning movement by the interengaging pointer edge 12, and a knurling 13, and is latched in a downward position by means of the latch element 16 and the cooperating groove of the knob, the tubular key member may rotate freely as film is wound from the retort to the supply spool.

It is only when the web 26, which is here shown as being carried by a pin 38 extending downwardly from the rewinding knob 6, is engaged in the slot 27, that the tubular member 28 must turn with the winding knob 6. As above explained, this cooperative relationship is only reached when the winding knob 6 is moved outwardly a distance slightly greater than the position shown in Fig. 3, by turning the knob until the web 26 registers with the slot 27.

The operation of the device shown above, is extremely simple, and moreover, definitely suggests the next operation to the user. Since it is necessary to move the winding mechanism to the position shown in Fig. 4 to unload or reload a retort, and since the winding mechanism projects in this position so far from the camera body, the natural step is to adjust the knob by thrusting it downwardly into its lowermost inoperative and laxed position. The film may then be wound and when it is necessary to rewind the film into the original retort, since the knob cannot be readily turned, the next natural step is to release the latch member 15—16 by moving the handle 19 in a direction opposite to that shown by the arrow in Fig. 5. This causes the handle to project upwardly into an accessible position and if the web 26 is not already in mesh with the slot 27, the first slight turning movement of the handle meshes these members. The film may then be rewound into the original retort R and when this winding movement is completed, the retort cannot be removed until the handle is drawn upward into the position shown in Fig. 4.

Having thus described my invention, what I claim and desire to be secured by Letters Patent of the United States is:

1. In a roll film camera, the combination with a camera body, a supply film chamber, a notched rewinding knob, a mount on which said knob may move axially, a projection on the camera body adapted to engage a notch in the knob, and a latch for holding the knob with the projection and notch in engagement, whereby said knob may be held against movement.

2. In a roll film camera, the combination with a camera body, an annular seat on the camera body, a supply film chamber, a notched rewinding knob adapted to be received by the annular seat, a mount on which said knob may move axially, to and from the seat, a projection on the camera body adapted to engage a notch in the knob when said knob lies in said seat, and a latch for holding the knob with the projection and notch in engagement whereby said knob may be held against movement.

3. In a roll film camera, the combination with a camera body, an annular seat on the camera body, a supply film chamber, a notched rewinding knob adapted to be received by the annular seat, a mount on which said knob may move axially to and from the seat, a projection on the camera body adapted to engage a notch in the knob when said knob lies in said seat, and a latch for holding the knob with the projection and notch in engagement whereby said knob may be held against movement, the latch for holding the knob in the seat including a latch element pivoted in the seat and having a handle extending therefrom, and a groove formed in said knob and having walls positioned to be engaged by said latch when the knob lies in the annular seat.

4. In a roll film camera, the combination with a camera body, a spool chamber therein, a film winding knob, a tubular member slidably carrying the winding knob, a spool engaging device carried by the tubular member, clutch elements on the knob and tubular member, means for engaging said clutch elements by drawing out the winding handle, said clutch elements being separated when the knob is moved towards the camera body, whereby film may be wound only when the winding knob is spaced from the camera body.

5. In a roll film camera, the combination with a camera body, a spool chamber therein, a film winding knob, a tubular member slidably carrying the winding knob, a spool engaging device carried by the tubular member, clutch elements on the knob and tubular member, a spring for thrusting the knob away from the camera body, a latch for holding the knob against the camera body, said clutch elements being held separated when the knob is latched against the camera body.

6. In a roll film camera, the combination with a camera body, a spool chamber therein, a film winding knob, a tubular member slidably carrying the winding knob, a spool engaging device carried by the tubular member, a snap latch normally holding the tubular member in a fixed position, a spring tending to raise the winding knob, clutch elements carried by the winding knob and tubular element adapted to be engaged by outward movement of the knob whereby the tubular element may be driven by the knob only when the knob is moved from the camera body, and means for holding the knob in an inoperative position against the pressure of said spring comprising a latch.

7. In a roll film camera, the combination with a camera body, a spool chamber therein, a film winding knob, a tubular member slidably carrying the winding knob, a spool engaging device carried by the tubular member, a snap latch normally holding the tubular member in a fixed position, a spring tending to raise the winding knob, clutch elements carried by the winding knob and tubular element adapted to be engaged by outward movement of the knob whereby the tubular element may be driven by the knob only when the knob is moved from the camera body, a latch for holding the knob against the camera body with the clutch elements disengaged, a plurality of notches in the winding knob, and a protuberance on the camera adapted to enter a notch to hold the knob in a fixed position disconnected from the tubular member.

8. In a roll film camera, the combination with a camera body, a spool chamber therein, a film winding knob, a tubular member slidably carrying the winding knob, a spool engaging device carried by the tubular member, a mount slidably carrying the tubular element, a snap latch normally holding the tubular element with the spool engaging device engaging a spool whereby said tubular member may be driven by the spool, clutch elements on the knob and tubular element engageable only when said knob is moved from the camera body, said knob being adapted to drive the film spool through the clutch elements and tubular member only when spaced from the camera body.

9. In a roll film camera, the combination with a camera body, a spool chamber therein, a film winding knob, a tubular member slidably carrying the winding knob, a spool engaging device carried by the tubular member, a mount slidably carrying the tubular element, a snap latch normally holding the tubular element with the spool engaging device engaging a spool whereby said tubular member may be driven by the spool, clutch elements on the knob and tubular element engageable only when said knob is moved from the camera body, a spring for moving the knob from the camera body into clutch engaging position for turning the spool through said clutch and tubular member, and a latch normally holding said knob against the action of its spring.

10. In a roll film camera, the combination with a camera body, a spool chamber therein, a film winding knob, a tubular member slidably carrying the winding knob, a spool engaging device carried by the tubular member, a mount slidably carrying the tubular element, a snap latch normally holding the tubular element with the spool engaging device engaging a spool whereby said tubular member may be driven by the spool, clutch elements on the knob and tubular element engageable only when said knob is moved from the camera body, a spring for moving the knob from the camera body into clutch engaging position for turning the spool through said clutch and tubular member, and interengaging parts on the knob and tubular member for moving the latter from its snap latched position to disengage the spool engaging device from a spool.

11. In a roll film camera, the combination with a camera body, a spool chamber therein, a film winding knob, a tubular member slidably carrying the winding knob, a spool engaging device carried by the tubular member, a mount slidably carrying the tubular element, a snap latch normally holding the tubular element with the spool engaging device engaging a spool whereby said tubular member may be driven by the spool, clutch elements on the knob and tubular element engageable only when said knob is moved from the camera body, a spring for moving the knob from the camera body into clutch engaging position for turning the spool through said clutch and tubular member, and interengaging parts on the knob and tubular member for moving the latter from its snap latched position to disengage the spool engaging device from a spool, a film designating scale carried by the knob, said knob having a plurality of notches therein, a seat for the knob in the camera body, a pointer including a notch engaging projection adjacent the seat, whereby said knob when latched in an inoperative position in its seat may designate the type of film loaded in the camera.

12. In a roll film camera, the combination with a camera body, a supply film chamber, a rewind knob, means for mounting said knob on said camera for rotative and axial movement, means engaging said knob and tending to move the latter axially outwardly from said camera, releasable means engaging said knob to prevent said outward movement, and means on said camera adapted to engage said knob when the latter is held against outward movement to lock said knob against rotative movement.

13. In a roll film camera, the combination with a camera body, a film winding knob carried by said body, a film indicating plate mounted on said knob, and means on said camera for holding said plate against rotation and for cooperating with said plate to designate the type of film positioned in said camera.

14. In a roll film camera, the combination with a camera body, a rotatable film rewind knob carried by said camera, a film indicating plate mounted on and movable with said knob, means on said camera adapted to engage said knob to lock the latter against rotation, and means cooperating with said plate when said knob is locked to indicate the type of film in said camera.

15. In a roll film camera, the combination with a camera body, a film rewind knob rotatably mounted on said body, a film indicating plate carried by said knob and movable as a unit therewith, means for mounting said knob for axial movement toward and away from said body, latch means adapted to engage said knob to retain the latter against said axial movement, and means adapted to engage said knob to lock the latter against rotation and to cooperate with said plate to indicate the type of film in said camera.

JOSEPH MIHALYI.